W. A. HARRIS.
LOW PRESSURE ALARM FOR PNEUMATIC TIRES.
APPLICATION FILED SEPT. 25, 1920.

1,368,927.

Patented Feb. 15, 1921.
2 SHEETS—SHEET 1.

WITNESSES

INVENTOR
W. A. Harris,
BY
ATTORNEYS

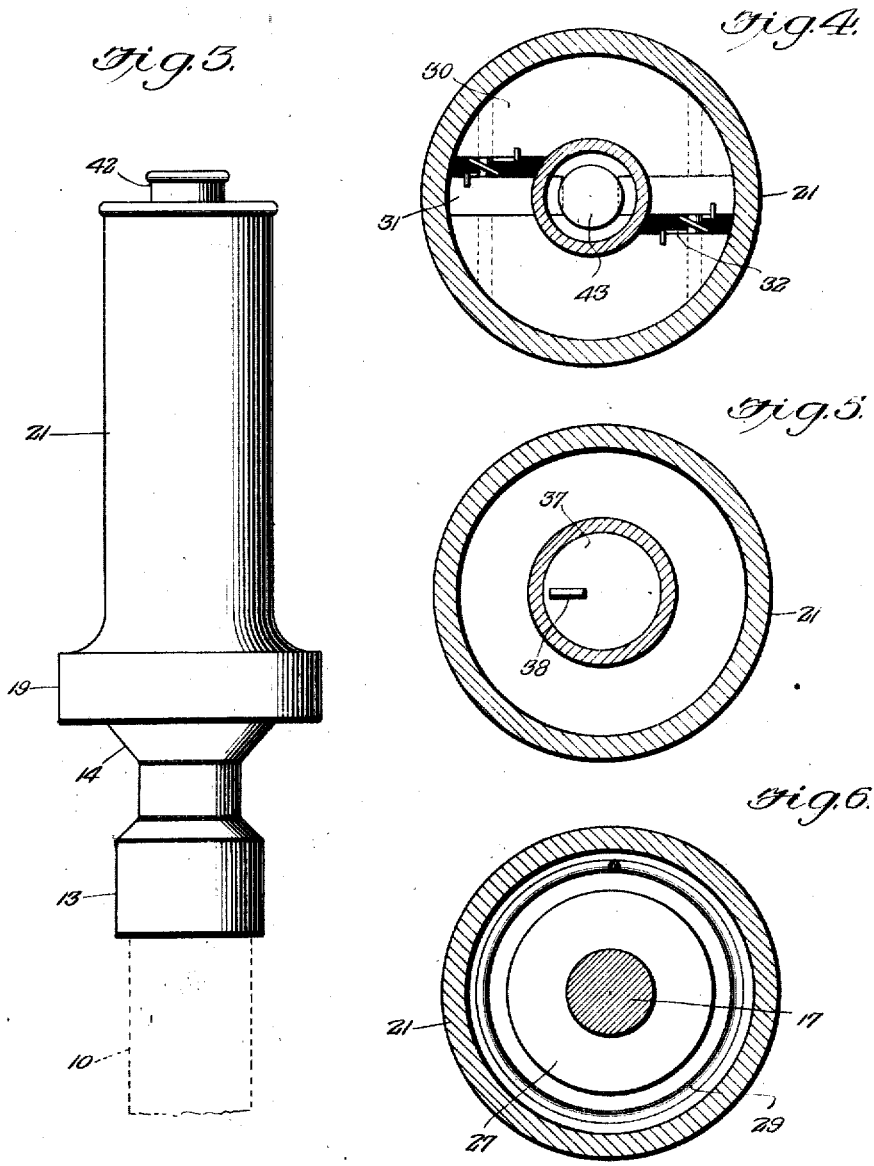

UNITED STATES PATENT OFFICE.

WILLIAM A. HARRIS, OF GREENVILLE, SOUTH CAROLINA, ASSIGNOR TO HARRIS ACCESSORY COMPANY, OF GREENVILLE, SOUTH CAROLINA, A CORPORATION OF SOUTH CAROLINA.

LOW-PRESSURE ALARM FOR PNEUMATIC TIRES.

1,368,927.  Specification of Letters Patent.  Patented Feb. 15, 1921.

Application filed September 25, 1920. Serial No. 412,671.

*To all whom it may concern:*

Be it known that I, WILLIAM A. HARRIS, a citizen of the United States, and a resident of Greenville, in the county of Greenville and State of South Carolina, have invented certain new and useful Improvements in Low-Pressure Alarms for Pneumatic Tires, of which the following is a specification.

My present invention relates generally to low pressure alarms for pneumatic tires of automobiles and other motor cars, my primary object being the provision of a device readily attachable to the valve tube of a pneumatic tire and operable to sound a signal upon fall of pressure a predetermined number of pounds below the pressure within the tire when the alarm is connected therewith.

A further object is the provision of a low pressure alarm which will operate effectively at any pressure without adjustment therefor and in connection with which it is possible to secure proper action of the alarm upon a fall of pressure of a predetermined number of pounds.

A still further object is the provision of a low pressure alarm embodying an audible as well as a visible signal, in which the signal member has movement to an exposed or visible position simultaneous with the sounding of the alarm and in which the visible signal will remain exposed subsequent to the sounding of the audible alarm and until reset.

A still further object is the provision of a low pressure alarm in which the operating parts are so housed and protected as to preclude disadvantageous effect of climatic changes, dirt, water and the like as well as one in which alarm is sounded and the visible signal exposed without utilizing tire pressure for this purpose.

In carrying out my invention I provide a low pressure alarm which may be readily screwed upon the ordinary tire valve tube and which when in such position has the effect of opening the tire valve to a sufficient extent to expose a diaphragm to the action of the air pressure existing at that time within the tire. This diaphragm is acted upon by a spring whose pressure is constant in the sense that it need not be adjusted for different pressures existing in different tires and whose operation is the same or practically the same at all pressures within the limits of movement of the diaphragm. The diaphragm is also in connection with a member movable therewith and whose movement under the action of the spring, that is inwardly against the pressure opposing the diaphragm, has the function of releasing a spring actuated signal member and for the purpose of automatic adaptation to various pressures within the limits of movement of the diaphragm, this signal releasing member is engageable at various points by the signal member in such manner that the ultimate result is the same in all instances.

The signal member has a limited movement within and from the alarm and is fully protected in its normal set position ready for instant action in spite of dirt, moisture and the like collecting upon the outside of the alarm, and embodies means to sound an alarm upon its movement to exposed position. In my alarm thus generally outlined, and as will be better understood from the following specification, the air pressure of the tire is not utilized to sound an alarm and is not therefore expended in either the sounding of the alarm or the exposing of the visible signal.

These objects and the advantages resulting therefrom will be better understood from the description to follow and by reference to the accompanying drawings, which latter form a part of this specification and in which, Figure 1 is a vertical sectional view taken through my improved low pressure alarm with the parts in the normal set position.

Fig. 3 is a side view, and

Figure 1:
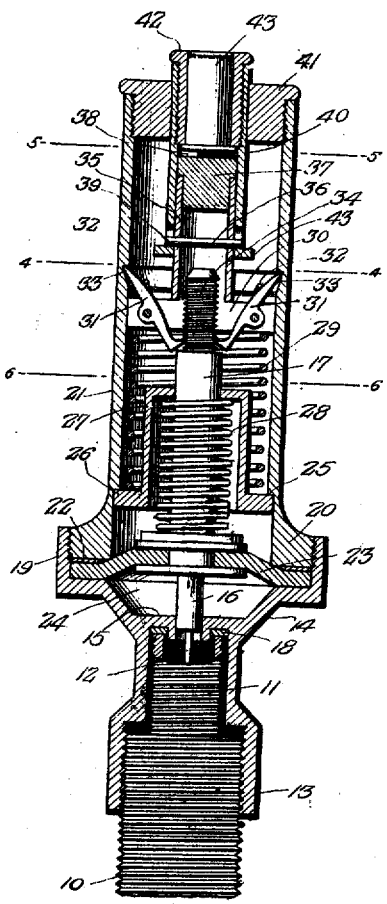

Figs. 4, 5 and 6 are cross sections taken respectively on lines 4—4, 5—5 and 6—6 of Fig. 1.

Figure 2:
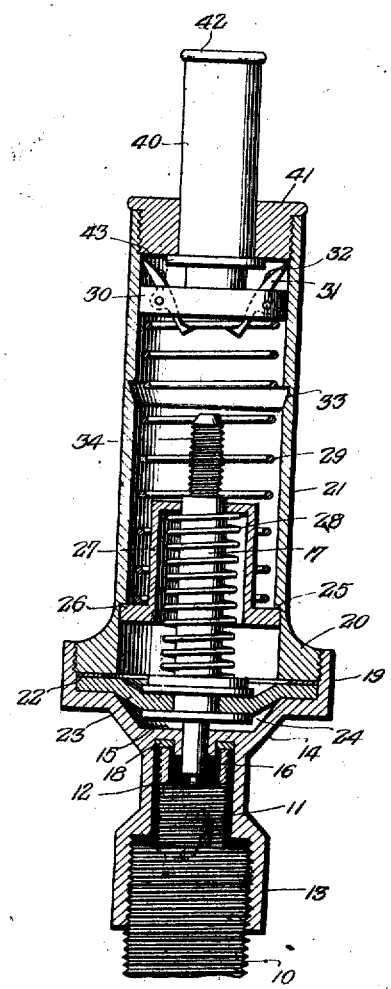
Fig. 2 is a similar view with the parts in the active or signaling positon.

Referring now to these figures I have shown, particularly in Figs. 1 and 2, the valve tube 10 of a pneumatic tire, the usual upper reduced cup receiving portion of which is shown at 11, partly broken away to expose in part the valve stem 12.

The valve tube 10 is in my improved alarm received within the lower enlarged and threaded portion 13 of a holder 14 having a transverse guide wall 15 centrally apertured to form a bearing for the lower reduced end 16 of a valve stem engaging pin 17. The guide wall 15 receives against its lower surface a washer 18, preferably of lead or other soft metal adapted to form a tight joint with the mouth of the valve tube 10 at the upper end of its reduced neck 11.

The upper portion of the holder 14 is enlarged and has an upstanding annular flange 19 internally threaded for the reception of the lower flared or enlarged end 20 of the barrel or casing 21, whose lower end is threaded for this purpose and screws into the flange 19 against a washer 22, in turn bearing upon the perimeter of a flexible diaphragm 23 which is thus clamped within the upper enlarged portion of the holder 14.

To the center of the diaphragm 23 the stem 17 previously mentioned is secured in such manner as to form an air receiving chamber 24 between the lower surface of the diaphragm and the bearing wall 15 through the aperture of which air pressure finds its way around the lower reduced end 16 of the stem when the holder is screwed on to the valve tube 10 and the lower end of stem 16 forces the valve stem 12 downwardly sufficient to slightly open the tire valve. From this chamber 24 it is to be noted that passage of air is prohibited into the barrel 21 by virtue of the diaphragm itself.

Above its lower flared or enlarged end 20, the barrel 21 is cylindrical and preferably of one outside diameter throughout, its bore being however slightly enlarged adjacent to its lower end to provide an internal annular shoulder 25 against which the lower annularly flanged end 26 of a spring housing tube 27 abuts. This tube is inserted upwardly into the lower end of the barrel 21 and has an internal flange at its upper end around the pin 17, against which latter flange the upper end of a spring 28 has bearing. This spring 28 is coiled around that portion of the pin 17 immediately above the diaphragm 23 against which its lower end bears, and is at a predetermined pressure sufficient to cause downward movement of the diaphragm and consequently pin 17 a distance sufficient to release the signal member when there is a fall of a certain pressure say from ten to fifteen pounds below that pressure previously existing in the tire and to which the diaphragm was originally exposed when the parts were set or reset.

The tube 27 is of a diameter substantially less than that of the barrel 21, leaving an annular space around the tube for the reception of a signal actuating coil spring 29 whose lower end has bearing on the lower outer flange 26 of the tube and whose upper end engages the lower surface of the lower cylindrical body 30 of the signal member slidably mounted in the upper portion of the barrel 21.

The body 30 of the signal member is diametrically slotted, and upon opposite sides of its center are fulcrumed dogs 31, whose upper portions are engaged by springs 32 so as to force the same outwardly into engagement within an inner annular groove 33 intermediate the ends of the barrel 21. The lower ends of these dogs 31 have inwardly presented engaging edges which coact with the upper reduced and threaded end 34 of pin 17 whose relation to the dogs is such that the latter are permitted to expand into the barrel groove when their lower ends extend into the groove of the threaded end 34 and then only. Lengthwise movement of pin 17 a sufficient distance to cause the lower inner ends of the dogs to ride outwardly on the threads, at the same time forces the upper ends of the dogs inwardly free of the groove 33.

The lower diametrically slotted body 30 of the signal member has a rigid upright tube 35 provided with a rigid cross pin 36 intermediate its ends and having at its upper end a firing block 37 provided with an upstanding firing lug 38. The extremities of the cross pin 36 project beyond the tube 35 and through diametrically opposed lengthwise slotted openings 39 adjacent to the inner flanged end of an outer tube 40, the latter of which extends upwardly beyond the upper end of the inner tube 35 and also beyond the firing block 37, and is slidable through the central bearing aperture of a bushing 41 threaded into and closing the upper end of the barrel 21. The upper end of the outer tube 40 is internally threaded for the reception of a tubular cartridge holding screw 42 into which for the purposes of an audible signal a cartridge 43 is inserted upwardly, a blank cartridge of course, so that when the cartridge holder is screwed inwardly the cartridge cap rests firmly against the firing lug 38.

It is obvious that when the signal member is released from its set or inner position shown in Fig. 1, the entire member is shifted upwardly and outwardly to the exposed position of Fig. 2 under the tension of the signal actuating spring 29 and it is likewise obvious that when the flange 43 at the inner end of the outer tube 40 comes into contact with the inner surface of the bushing 41, this outer sleeve with its cartridge holder is arrested, and the further relative movement of the inner sleeve 35 with the body 30 brings about effective pressure of the firing lug 38 against the inner cap of the cartridge 43 so that the latter is exploded. The explosion attracts the operator's attention and in order to further inflate the tire it is simply necessary to unscrew my improved alarm from the valve tube 10 in somewhat similar manner to the removal of the ordinary valve cap, and without any greater trouble. After reinflation the cartridge holder 42 is unscrewed and a fresh cartridge inserted, the holder replaced, and then the alarm as a whole replaced upon the valve tube.

On the other hand if after the audible alarm is sounded inspection of the tire shows that the puncture is not a bad one and but a slow slight leak is effecting a reduction of pressure, all the operator need do, if for instance he is homeward bound and feels further reduction of pressure may be allowed without greatly endangering the tire as a whole, is to place a fresh cartridge in position and again press the signal member inwardly until the dogs 31 reëngage with the pin 17 and the barrel groove 33. In this way the alarm will be reset permitting of a further reduction of the predetermined number of pounds before the alarm is again actuated and it becomes obvious that the automatic adaptability of the alarm to any pressure existing in a tire at t' ɔ time of placing the alarm in position or resetting the same is permitted by virtue of the adjustable engagement between the dogs 31 and the signal releasing pin 17.

For the above purposes it is necessary that the inner ends of the dogs 31 should simultaneously drop into portions of the groove between the threads 34, but it is obvious that the signal member as a whole is susceptible of rotation so that if at the first trial upon pressing the signal member inwardly, the dogs do not properly drop into portions of the groove between the threads of the pin 17 it is simply necessary to partially rotate the signal member in order to find portions of the groove into which the dogs will properly drop.

It is obvious from the foregoing that with my improved alarm I avoid the common disadvantage of devices of this general nature which exhaust pressure from a tire in the sounding of an audible alarm either for a limited period or while there is any pressure left in the tire, and it is equally obvious that by combining an audible with a visible signal I not only provide for certain knowledge of the operator when the signal member is released but I also provide for his subsequent knowledge that it has been released in cases where he happens to have been remote from his machine when the signal member is released. For this purpose it is only necessary for the operator to glance at the several alarm members after he has been absent from the car for a time, in order that he may keep himself clearly posted as to the air pressure they contain.

My invention proposes an arrangement however in which the signal members, that is both audible and visible are normally housed to such an extent as to preclude failure of operation by virtue of dust, dirt or moisture around the signal member, and by thus normally maintaining the parts in this housed condition I provide for great durability and unfailing action.

By virtue of the adjustable engagement between the signal member and the signal releasing member, the latter automatically adapts itself to the various positions of the diaphragm 23 under varying pressures so that the alarm as a whole will act in the same manner in connection with various pressures between certain high and low limits or in other words between the limits of movement of the diaphragm. The parts can be so arranged as shown so as to take care of all pressures between for instance thirty and ninety pounds in the ordinary device, which adapts the alarm to practically all ordinary automobiles or pleasure cars. The same construction may be followed out with heavier springs to take care of pressures between say ninety pounds and one hundred and twenty-five pounds, for motor trucks and the like.

I claim:

1. A low pressure alarm having a holder threaded to screw on to a tire valve tube, a casing carried by the holder, a valve stem engaging pin movable in the casing and having a controlling diaphragm and an actuating spring for shifting the pin inwardly against pressure opposing the diaphragm, a signal member having limited movement into and out of the casing, an actuating spring for moving said signal member outwardly and means for holding the signal member in the inner position carried by said signal member and engageable with the casing at a fixed point, said means having adjustable engagement with said valve stem engaging pin and being releasable therefrom by inward movement of the pin under the action of its spring.

2. A low pressure alarm having a threaded holder to receive a tire valve tube, a barrel supported by the holder, a spring actuated valve stem engaging pin having a controlling diaphragm exposed to air pressure and arranged to cut off communication between the holder and the barrel, a spring actuated signal member having a limited movement into and out of the barrel, and means for holding the signal member in the inner position carried by the signal member and having engagement with the barrel at a fixed point, said means having adjustable engagement with the valve stem engaging pin and being releasable by movement of the latter under tension of its spring.

3. A low pressure alarm including a holder having a threaded valve tube receiving bore, a barrel carried by the holder, a signal releasing pin within the barrel, having a reduced valve stem engaging end in the holder, a diaphragm through which the said pin is connected, arranged to cut off communication between the holder and the barrel, a spring in the barrel for actuating said pin against the pressure of said diaphragm, a spring actuated signal member having limited movement into and out of the barrel, and means for holding the signal member in the inner position adjustably engageable with the said pin, said means having engagement with the barrel at a fixed point and being releasable upon movement of the said releasing pin under tension of its actuating spring.

4. In a low pressure alarm, a casing, spring actuated pressure controlled releasing means within the casing, a signal member having a limited movement into and out of the casing, said signal member having means engageable with the casing to normally prevent movement thereof and in adjustable connection with the releasing means for release by the latter from the casing.

5. In a low pressure alarm, a casing, spring actuated pressure controlled releasing means within the casing, a signal member having a limited movement into and out of the casing, said signal member having holding means releasably engaging a portion of the casing, and said releasing means having a portion adjustably engageable by the holding means of the signal member for the purpose described.

6. In a low pressure alarm, a casing having an internal annular groove, a lengthwise shiftable spring actuated and pressure controlled releasing pin in the casing, a spring actuated signal member having a limited movement into and out of the casing, and pivoted dogs carried by the signal member engageable at one end into the groove of the casing, said releasing pin having a reduced threaded end into portions of the groove between the threads of which the other ends of the said dogs engage when the latter shift into the casing groove.

WILLIAM A. HARRIS.